United States Patent
Hofstein

[15] 3,646,391
[45] Feb. 29, 1972

[54] IMAGE-TRANSDUCING STORAGE TUBE

[72] Inventor: Steven R. Hofstein, Princeton, N.J.

[73] Assignee: Princeton Electronic Products, Inc., Princeton, N.J.

[22] Filed: Nov. 13, 1969

[21] Appl. No.: 876,285

[52] U.S. Cl. ....................315/12, 313/65 AB
[51] Int. Cl. ....................H01j 29/50
[58] Field of Search ....................315/12; 313/66, 65 AB, 89

[56] References Cited

UNITED STATES PATENTS

| | | | |
|---|---|---|---|
| 3,423,623 | 1/1969 | Wendland | 313/65 |
| 3,523,208 | 8/1970 | Boomer et al. | 313/66 |
| 3,512,038 | 5/1970 | Kazan | 315/12 |

*Primary Examiner*—Rodney D. Bennett, Jr.
*Assistant Examiner*—N. Moskowitz
*Attorney*—Samuelson & Jacob

[57] ABSTRACT

An electronic storage tube is disclosed which enables image-configurated radiant energy to be directly transformed into a corresponding charge pattern on an insulating mosaic surface of the tube target. In a preferred embodiment of the invention, the target of the tube comprised a doped silicon substrate, upon which a mosaic of insulating silicon dioxide islands has been formed. Those areas of the substrate not covered by the insulator are diffused with an impurity of the same type as the background silicon, resulting in a degenerate surface layer in said areas with consequent electrical isolation of said islands. Manipulative process steps are also set forth enabling formation of the charge pattern on said substrate, and enabling non-destructive readout thereof.

15 Claims, 4 Drawing Figures

INVENTOR.
STEVEN R. HOFSTEIN
BY Samuelson & Jacob
ATTORNEYS

INVENTOR.
STEVEN R. HOFSTEIN
BY Samuelson & Jacob
ATTORNEYS

IMAGE-TRANSDUCING STORAGE TUBE

This invention relates generally to electronic storage tubes, and more specifically relates to devices of this type which are adapted to store for readout an electrostatic charge pattern corresponding to a radiant energy input.

In numerous applications of electronic technology it is desirable to convert a radiant energy input—such as an optical image—into a corresponding electrical pattern at the target of a storage tube. The resulting stored pattern, typically an electrostatic charge image, may serve, for example, via readout by appropriate electron-beam scanning techniques, to provide electrical signals for use in facsimile or television systems; or the stored pattern may simply serve as a memory or as buffer storage for data-handling systems, display systems, or similar apparatus.

Within recent years a series of storage tubes have thus been developed which employ semiconductor target structures to transduce radiant energy patterns provided thereto into electrical variations across the face of the tube target. Generally the target structures of these devices have comprised arrays of PN-junctions, which, in a typical mode of operation, are reverse-biased by an initial sweep with a scanning electron beam and then exposed to the pattern to be transduced. Photon production of hole-electron pairs effects selective discharge across the diodes at points of energy incidence thereby yielding the desired charge pattern or capacitance variations among the diodes.

In addition to the fact that targets incorporating arrays of such PN-junctions are fabricated only with great difficulty, there are other serious problems stemming from use of the diode arrays. For example, variation among the multiplicity of diodes on the target affects the accuracy of stored information. Furthermore, leakage between adjacent diodes tends to impair device resolution, while leakage current across the junctions of individual diodes tends to reduce device sensitivity and storage time. In addition, it has proved difficult to design economically feasible targets of the arrayed diode-variety which are susceptible of multiple readout by the scanning electron-beam without impairment of the stored charge pattern. The ability to read out a stored pattern a plurality of times without detrimentally affecting the image, is however, a most significant consideration where the storage tube is used in a scan compression environment.

In accordance with the foregoing, it may be regarded as an object of the present invention to provide a radiant energy sensitive storage tube enabling image-configurated radiant energy to be directly transformed into a corresponding charge pattern on an insulating mosaic surface at the target of said tube.

It is a further object of the invention to provide a radiant energy sensitive storage tube incorporating as its transducing element a single conductivity-type structure which may be simply and economically produced.

It is an additional object of the present invention to provide a radiant energy sensitive storage tube, which provides high sensitivity to radiant energy—including high energy electron beam—inputs and produces very high resolution in the transduced charge pattern established therein in correspondence to the said input.

It is a still further object of the present invention to provide a radiation sensitive storage tube, wherein the transduced charge pattern corresponding to an input pattern may be stored for exceedingly long periods, and may furthermore be read out a plurality of times without substantial destruction thereof.

It is yet another object of the present invention to provide a radiant energy sensitive storage tube wherein the insulating mosaic surface at which the charge pattern corresponding to the input is established, consists of a plurality of insulating islands, which islands are electrically isolated from one another in such a manner that very little dark current flows in the device, thereby increasing optical sensitivity.

Now in accordance with the present invention, the foregoing objects, and others as will become apparent in the course of the ensuing specifications, are achieved by means of a storage tube construction wherein the target element comprises a doped semiconductor substrate upon which a mosaic of insulating islands is formed, a diffusion region of much heavier dopant concentration being present at exposed surfaces of the substrate and serving to augment electrical isolation of the islands. The target structure—which thus includes a substrate of but a single conductivity-type material—is sensitized to its transducing function by an initial sweep of the mosaic by the beam in the presence of sensitizing radiation and a potential applied to the substrate, followed by a step increase in the said applied potential and an electron beam sweep in the absence of radiation. Exposure is then made to the pattern to be transduced, after which the mosaic is returned to a uniform potential by a sweep with the electron beam, a varying charge pattern than being present on the mosaic surface. Finally the target structure is flooded with sensitizing radiation to discharge any remnant depletion regions and the applied bias potential is lowered whereby the maximum potential at the mosaic surface is below the cathode potential utilized for the electron gun. The resulting electrostatic charge image on the mosaic is then susceptible to multiple readout without substantial destruction thereof, and moreover may be retained on the insulating mosaic surface for very long periods of time.

The invention is diagrammatically illustrated, by way of example, in the appended drawings, in which.

Figure 1:
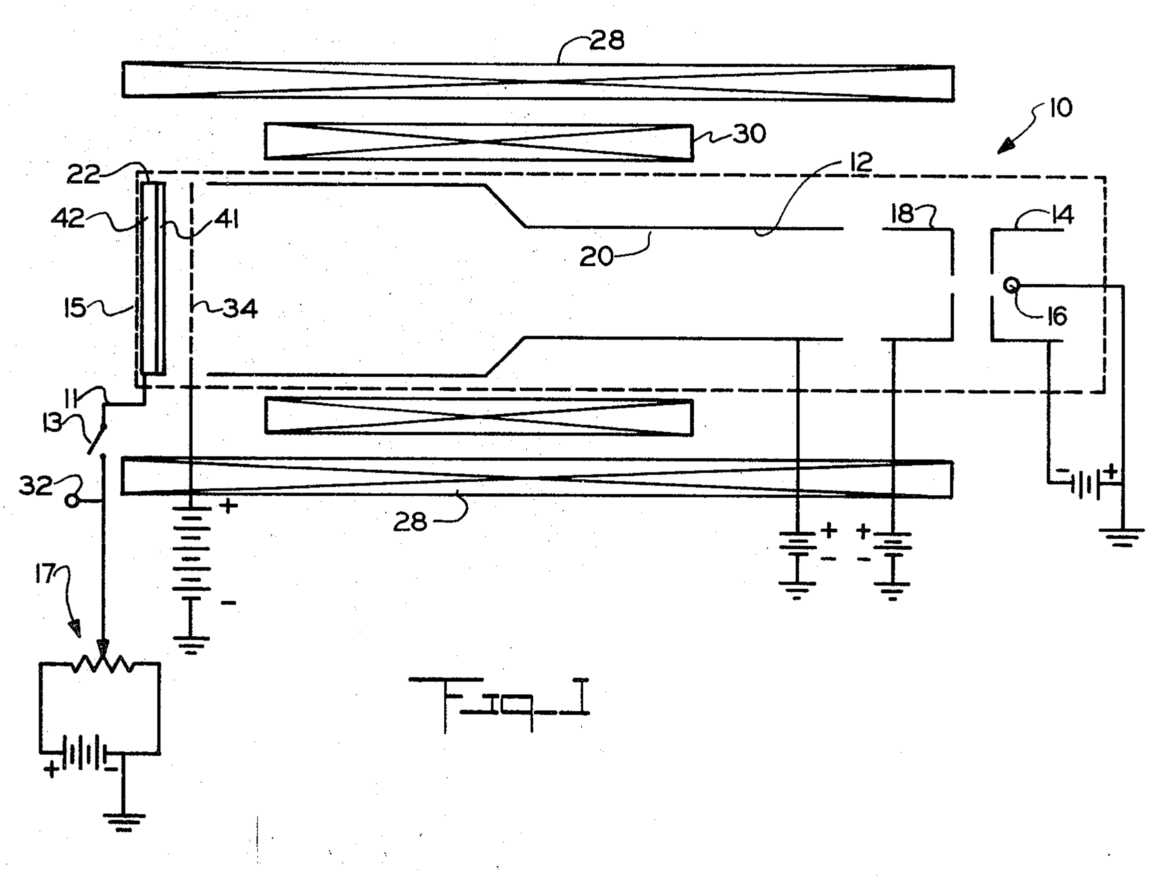
FIG. 1 is a schematic, elevational view of an optically sensitive storage tube in accordance with the invention.

In FIG. 1, a radiant energy sensitive storage tube in accordance with the present invention, is schematically depicted. In broad outline, this tube resembles that disclosed in my copending application, Ser. No. 840,698 filed July 10, 1969, entitled "Electronic Storage Tube" and assigned to the assignee hereof. However, unlike the invention described in my copending application, wherein the stored image is formed by conventional electron beam writing techniques, the present device includes a target structure which is active in nature, and more specifically which is adapted to yield a stored electrical pattern by transduction of a radiant energy input; moreover the present device is operated in a specific manner to yield the said stored pattern.

As used herein, it will be understood that the phrase "radiant energy input" encompasses not only inputs at visible light wavelengths, but also inputs comprising photons having higher or lower energies than are characteristic of visible wavelength radiation. In a functional sense, radiant energy inputs appropriate to the present invention are such as will produce, by impingement on the target structure thereof, the hole-electron pairs which will be seen to be central to establishment of a stored charge pattern. In consideration of this functional test it will be clear that high energy electron beams are also to be deemed include within the phrase "radiant energy input" as used herein, as such electron beams are completely capable of providing the energies for hole-electron pair formation in the present target structures. In reading this specification it should also be appreciated that the phrase "image" or "pattern" as used herein, is not meant to suggest that the inputs or transduced charge corresponding thereto need be capable of presenting coherent information to the eye; such "patterns" may merely, for example, represent information density such as the analog value of some parameter the observed variation of which is to be thereby stored on the target element of the invention.

The tube, generally designated at 10, includes an evacuated envelope 12, control grid 14, cathode 16, accelerating anode 18, wall anode 20, target 22 which comprises substrate 42 and mosaic layer 41, deflecting coil 28, focusing coil 30, output terminal 32, and grid mesh 34. Envelope 12 will typically be formed of glass, and in the embodiment shown in FIG. 1—which is particularly suited for use with optical inputs—the end plate 15 thereof will comprise a transparent low distortion material, whereby such optical inputs, e.g., focused images, may be made incident upon target 22 through plate 15. It is possible, of course, to render optical or similar inputs incident upon target 22 other than through plate 15: e.g., fiber optic bundles can be used to induct patterned light to the vicinity of plate 15. Furthermore, where the input to be transduced comprises a modulated high energy electron beam, modifications will be made in the FIG. 1 structure enabling accommodation of the added beam forming and modulating elements. Reference may be had in this latter connection to U.S. Pat. No. 3,440,477 disclosing a charge storage device which includes such additional elements.

Figure 2:
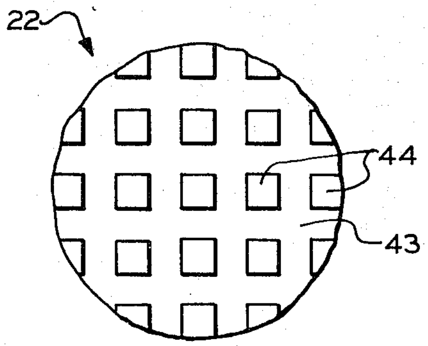
FIGS. 2 and 2A illustrate, respectively, partial plan and cross-sectional views of a target structure which may be utilized in accordance with the invention.
Figure 2A:
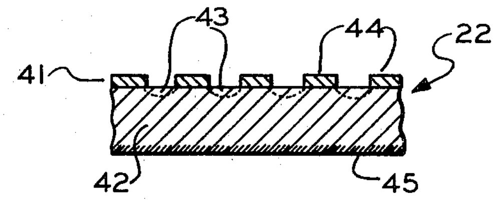

The structure of target 22 is best seen in FIGS. 2 and 2A. As shown therein target 22 includes a semiconductor substrate 42, upon which is formed an insulating mosaic 41 of discrete islands 44. While various semiconducting materials may be utilized in accordance with the invention, the preferred material is silicon which has been doped to yield an approximate conductivity of 10 ohm-centimeters. For purposes of concretely illustrating the invention it will be assumed that such silicon is doped to yield an N-type material, but analogous P-type structures are applicable to the invention, provided modes of operation of the tube are such as to appropriately utilize secondary emission characteristics of the mosaic 41. In a typical instance substrate 42 will comprise a monocrystalline silicon wafer no thicker than about 25 microns, preferably about 10 to 12 microns. A thin structure is important for obtaining good image resolution, and in some applications it may be desirable to obtain minimal thicknesses by etching the wafer to yield a flat-bottomed well therein, which well bottom will lie opposite mosaic 41 and render target 22 very thin in such sections.

Where substrate 42 comprises the alluded-to silicon, islands 44 will preferably be formed from the substrate oxide—and will typically comprise silicon dioxide. As is disclosed in my previously referred to, copending application, excellent targets are achieved where the silicon dioxide is genetically derived from the underlying silicon by oxidizing the surface of a wafer of doped silicon and photoetching the resulting 1 micron or so oxide layer to yield mosaic 41. The islands 44, which will typically be minute squares, are about 3 to 5 microns on a side.

In accordance with the present invention, target 22 is provided with an impurity diffusion layer of the same conductivity type as the substrate at surfaces of the substrate which are not covered by insulating islands 44. In particular, where substrate 42 comprises the N-type silicon cited, an N+ diffused grid 43 is provided between islands 44, and an N+ diffused back layer 45 is provided at the target surface opposite mosaic 41. Techniques for diffusion of high levels of impurities to yield N+ or P+ regions in semiconductors is a well understood art and need not be described in detail here. Suffice it to point out that in the present device the impurity will typically comprise phosphorus and that the diffused regions will penetrate about ½ to 1 micron under the exposed surfaces of substrate 42. Impurity concentrations at these diffused regions will be of the order of $10^{20}$ atoms per cubic centimeter, and the surface layer in such an N+ region may be regarded as degenerate.

The impurity diffusion layer cited has several important functions in the present device. First, the diffused back layer 45 both facilitates electrical connection to readout terminal 32 and biasing source 17, and provides an internal electric field tending to prevent recombination of the minority carriers that will be formed by photons (or high energy electrons) impinging on the target. More important, diffused grid 43 serves, during use of the target in imaging, to prevent formation of an inversion layer under portions of the substrate surface not covered by islands 44. The action of diffused grid 43—which will be more fully appreciated in connection with the description of FIG. 3—therefore is such as to electrically isolate adjacent oxide/silicon regions so that no cross-coupling of minority carriers is possible. At the same time, the diffused grid 43 minimizes minority carrier generation at the oxide edges which would result in a high dark current and loss of optical sensitivity.

The manner in which a radiant energy input is transduced at target 22 may now be set forth. For purposes of concrete illustration it will be assumed that such input is at optical frequencies, but it will be appreciated that the basic mechanisms to be cited will similar where electron-hole production in the target 22 is effected by other patterned energy. Referring then to the schematic showing of FIG. 3, a sequence of steps (*a*) through (*e*) is depicted which illustrate the processes occuring in two representative sections of target 22, the first **22*a* of which is exposed to a "light" portion of the optical image to be transduced, and the second 22*b*** of which is exposed to a "dark" portion of the optical image. In order, again, to concretely illustrate practice of the invention, electrical parameters such as potentials will be specified herein which are appropriate to the exemplary N-silicon/silicon oxide structure discussed in preceding paragraphs. Recitation of such parameters, is not, of course, intended to delimit the invention otherwise set forth.

In step (a), with switch 13 closed, a potential of the order of 10 volts is applied to the diffused back layer 45, from biasing source 17 while the target is flooded with actinic light from a source external to the tube. Simultaneously, electron beam 51, emanating from the grounded cathode 16, is made to sweep the target, thereby depositing negative charge of density $Q_s$ on both islands **44*a* and 44*b*, and bringing the surfaces of both islands to zero potential. Hole-electron pairs result from the flooding light beam and minority carriers (holes) 48 migrate to the silicon/silicon oxide interface. Diffused grid 43** prevents buildup of minority carriers except at such interface.

Figure 3:
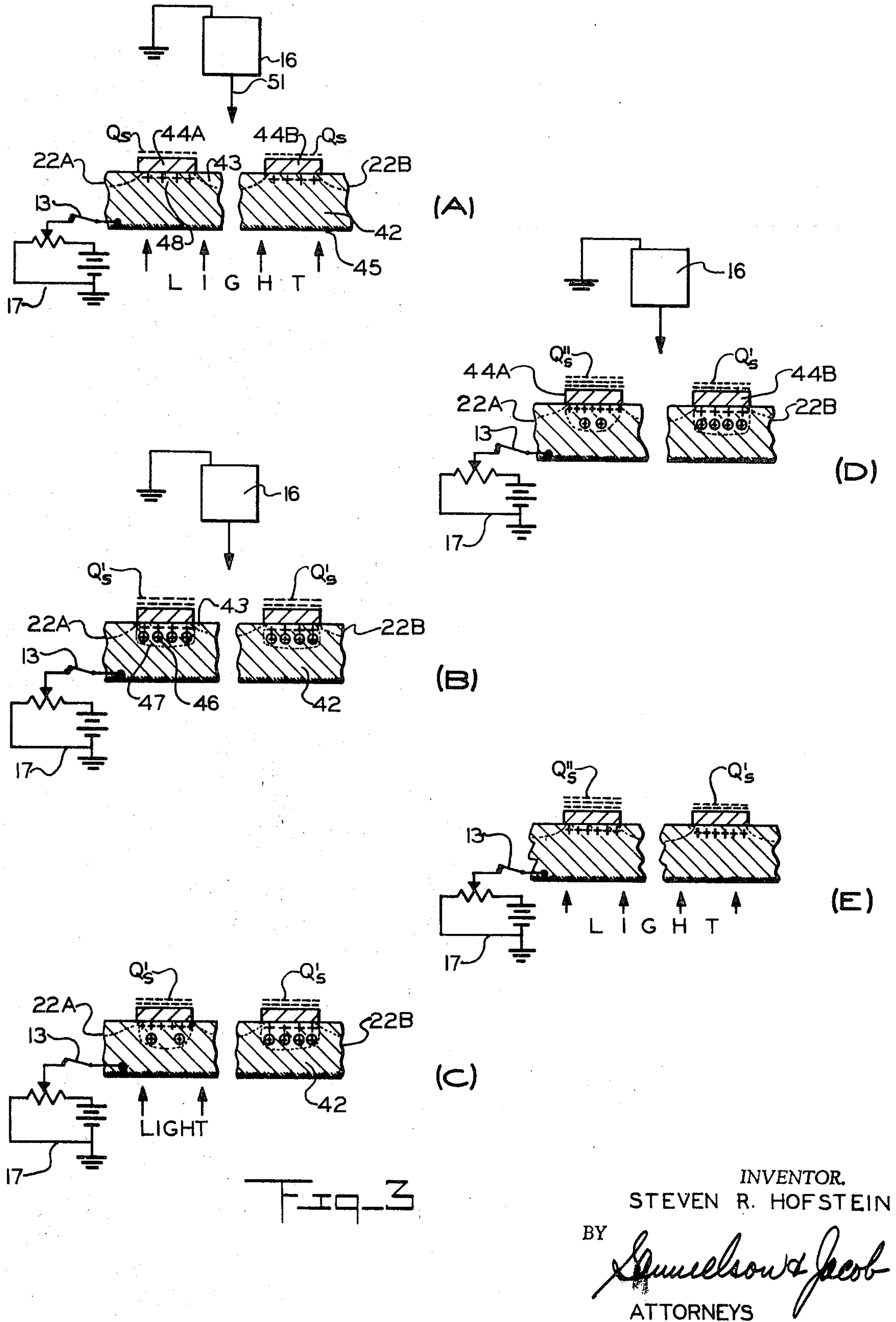
FIG. 3 illustrates in a highly schematic fashion, the sequential steps involved in transducing an optical image to electrical form for storage at the target of FIGS. 2 and 2A.

In step (b) of FIG. 3 the bias from source 17 is raised some 10 volts—to +20 volts—while the target remains in darkness, and the target is reswept by the electron beam. Additional charge is thereby added to the islands **44*a* and 44*b*, the charge density on both now being $Q'_s$. The additional charge is balanced by bound lattice charge 46, and depletion regions 47 are now present in sections 22*a* and 22*b*, except that such depletion regions do not extend under the diffused grid 43**.

In step (*c*) the target 22 is exposed to a pattern of light and shadow (an optical image). Section **22*b*** is in darkness and remains as in step (*b*). Section **22*a***, however, is struck by light and additional minority carriers migrate to the silicon/silicon oxide interface. When, in step (*d*), the target surface is brought back to the zero cathode potential, island **44*a* is therefore able to accept additional charge and the density on 44*a* becomes $Q''_s$, while that on 44*b*** remains $Q'_s$.

Finally in step (e) the target is flooded with light, which discharges remnant depletion regions, and the bias potential from source 17 is lowered thereby assuring that the potential at all points on the insulating mosaic is below zero. This, in turn, assures that during the readout process no additional charge will land on the mosaic—whereby such readout may be nondestructive of the charge image on the mosaic.

Readout of the charge pattern stored at target 22 is achieved in a manner identical with that described in my earlier cited copending application. In particular the insulating mosaic 41 of target 22 acts essentially as a coplanar grid, and accordingly as the readout electron beam sweeps the target 22 the current in lead 11 of FIG. 1 varies in accordance with the charge on the overlying mosaic. During readout, with switch 13 closed, bias source 17 will typically be adjusted to bring the target to about +8 volts, and scanning will be in rastered fashion with the potential at grid 14 adjusted to yield an output signal at terminal 32 of approximately 200 na. Continuous readout is possible under these conditions for more than 10 minutes, and longer storage time is possible if the readout signals are smaller. Because of the dielectric relaxation time of silicon dioxide, with the beam off, storage periods of 1 week or more are possible.

Upon completion of the readout process erasure of the stored image is accomplished by raising the bias voltage from source 17 to several hundred volts—e.g., to +300 volts, and sweeping mosaic 41 with the electron beam. Under such conditions secondary emission at the target surface raises the mosaic to a uniform positive potential whereby return of the bias to the order of +10 volts enables the condition of FIG. 3(*a*) to be then reestablished.

While the present invention has been particularly described in terms of specific embodiments thereof, it is apparent to those skilled in the art that numerous modifications are possible without departing from the spirit of the invention and the scope of the subjoined claims.

The embodiments of the invention in which an exclusive property or privilege is claimed are defined as follows:

1. A radiant energy sensitive storage tube for transducing an incident radiant energy pattern into a stored charge pattern in said tube, comprising:
   - an evacuated envelope;
   - a storage target positioned within said envelope to receive said incident radiation pattern, said target comprising:
   - a single conductivity-type, doped semiconductor substrate adapted for formation of hole-electron pairs in the bulk thereof in response to said incident radiation;
   - a mosaic of discrete insulating islands overlying said substrate for receiving charge at the surfaces thereof in correspondence to minority carrier and lattice charge variations in adjacent portions of said underlying semiconductor, the surface of said substrate between said islands being free of insulation;
   - means for adjustably biasing said substrate; and
   - electron beam scanning means positioned within said envelope for scanning said target and applying charge to said mosaic.

2. Apparatus in accordance with claim 1 wherein said substrate includes a diffused impurity layer of the same conductivity type as said substrate, in at least those surfaces of said substrate between said islands.

3. Apparatus in accordance with claim 1 wherein said substrate includes a diffused impurity layer of the same conductivity type as said substrate, at all surfaces of said substrate not covered by said insulating islands.

4. Apparatus in accordance with claim 1, wherein said semiconductor comprises doped silicon and said islands comprise an oxide of silicon.

5. Apparatus in accordance with claim 4 wherein said islands comprise silicon dioxide and are genetically derived from said underlying silicon.

6. Apparatus in accordance with claim 5 wherein said silicon is of N-type conductivity.

7. Apparatus in accordance with claim 6 wherein said substrate includes a diffused N+ impurity layer in at least those surfaces of said substrate between said oxide islands.

8. Apparatus in accordance with claim 6 wherein said substrate includes a diffused N+ impurity layer at all surfaces of said substrate not covered by said oxide.

9. Apparatus in accordance with claim 8 wherein said islands are squares separated by a grid of N+ diffused regions of the silicon substrate.

10. Apparatus in accordance with claim 3, further including readout means connected to said substrate for receiving the modulated current therefrom as said target is scanned by said electron beam through the spaces of said overlying charge-bearing mosaic.

11. A method for transducing an incident radiation pattern to a charge pattern on an insulating mosaic overlying a doped semiconductor substrate, of the type adapted to produce hole-electron pairs in the bulk thereof in response to said radiation, comprising in sequence the steps of:
    - charging the surface of said mosaic to a uniform potential while flooding said semiconductor with said radiation and biasing said substrate to a polarity opposite that of said charge and the conductivity type of said semiconductor whereby radiation-generated minority carriers migrate to the interface of said semiconductor and said mosaic;
    - increasing said biasing potential and recharging in the absence of said radiation to said uniform potential, whereby additional charge is deposited on said mosaic and lattice charge of the same sign as said minority carriers appears at said interface;
    - exposing the said semiconductor to said radiation pattern to create additional minority carriers at interface areas adjacent semiconductor portions exposed to said patterned radiation; and
    - recharging said mosaic surface to said uniform potential, whereby points thereof overlying radiation struck portions of said semiconductor take on additional charge to yield said charge pattern corresponding to said radiation pattern.

12. A method in accordance with claim 11, further including the sequential step of flooding the semiconductor with sensitizing radiation to discharge remnant depletion zones, thereby allowing additional minority carries to migrate to the said interface and vary the potential of points on said mosaic surface.

13. A method in accordance with claim 12, further including the additional sequential step of lowering the said bias potential whereby the maximum potential at the mosaic surface is below the cathode potential utilized for the electron gun.

14. A method in accordance with claim 13 wherein said operations are conducted in an evacuated envelope, and said charging is effected by sweeping said mosaic with the beam of a cathode-grounded electron gun.

15. A method in accordance with claim 14, including the additional sequential step of reading out the stored charge pattern on said mosaic by scanning said substrate with said electron gun beam through spaces in said mosaic, and sensing the modulated current from said substrate through the lead to the means effecting said biasing.

* * * * *